United States Patent Office 3,299,142
Patented Jan. 17, 1967

3,299,142
PREPARATION OF ALKYL AMINES
Billy D. Simpson, Bartlesville, Okla., assignor to Phillips Petroleum Company, a corporation of Delaware
No Drawing. Filed May 27, 1963, Ser. No. 283,608
5 Claims. (Cl. 260—585)

This invention relates to the preparation of alkylamines. In another aspect, it relates to an improved method for the preparation of alkylamines by the ammonolysis of alkyl halides.

One known, fundamental method for the preparation of alkylamines is the ammonolysis of alkyl halides. This method, when it is commonly carried out in the presence of an alcohol such as methanol or ethanol as the reaction medium or diluent, produces the amine in the form of a hydrohalide salt. It is then necessary to neutralize the hydrohalide salt with a base stronger than the amine, using an alklai (usually sodium hydroxide), in order to obtain the free amine. Such neutralization requires a large amount of alkali and means another step in the process, thereby adding to the expense of this method of preparation.

Accordingly, an object of this invention is to prepare alkylamines. Another object is to provide an improved method for the prepartion of alkylamines by the ammolysis of alkyl halides. Another object is to prepare alkylamines in high yields and in an economical manner, without necessitating a neutralization step. Further objects and advantages of this invention will become apparent to those skilled in the art from the following description and accompanying claims.

I have discovered that the preparation of alkylamines by the ammonolysis of alkyl halides can be improved by using a liquid glycol as the reaction medium or diluent. When the ammonolysis of the alkyl hadilde is carried out in a glycol, the free amine is directly produced; that is, it does not result in the form of a hydrohalide salt. Thus, the free amine present in the reaction mixture can be recovered in a simple and economical manner, for example by simple extraction or distillation of the reaction mixture. Representative glycols which I can use for this purpose include ethylene glycol, propylene glycol, glycerol, and the like, including mixtures thereof.

The alkyl halides which can be used in this invention for preparing the alkylamines are preferably those in which the halide is attached to a primary or secondary carbon atom of the alkyl chain. These alkyl halides can be represented by the general formula RX, where R is an alkyl radical which has 1 to 20 carbon atoms, preferably at least 5 carbon atoms, and X is a halogen such as iodine, chlorine, or bromine. Representative alkyl halides which can be used in this invention include methyl chloride, methyl bromide, methyl iodide, ethyl chloride, 1-chloropropane, 2-iodopropane, 2-bromo-2-methylpropane, 2-chloro - 2-methylpropane, 1 - chloropentane, 1-bromohexane, 1-iodooctane, 2-bromooctane, 2-bromo-3-methylnonane, 1-iododecane, 1-chlorodecane, 5-iododecane, 3 - bromo - 2,3,4-trimethyloctane, 1-chlorododecane, 2-chlorododecane, 7-(2-methylbutyl)-6-bromopentadecane, 5-bromotetradecane, 6 - chlorohexadecane, 2-chlorooctadecane, 1-bromoeicosane, and the like, including mixtures thereof. An example of a feed containing mixed alkyl halides which can be used in this invention is that which is produced by the chlorination or bromination of a paraffin mixture such as kerosene or paraffins which result from the treatment of kerosene with molecular sieves.

The reaction conditions employed in this invention can vary over wide ranges, and these conditions can be functionally expressed as suitable ammonolysis conditions. Generally, satisfactory reaction temperatures will be in range of 100 to 250° C., preferably 150 to 200° C. The pressure employed in the reaction can be the autogenous pressure developed by the reaction mixture at the chosen reaction temperature, and such pressures can be as high as 1,000 to 1,500 p.s.i.g., and even 2500 p.s.i.g. and higher, particularly when high mole ratios of ammonia to alkyl halide are employed. The reaction times will vary considerably, depending upon the reaction temperature and other variables, but generally will be in the range of 0.5 to 50 hours, and generally less than 10 hours. The reaction can be carried out in a batch or continuous manner.

The amount of glycol used will be, stated functionally, that sufficient to have it serve as a diluent for the reaction. Usually, the glycol used will be 25 to 95 weight percent, preferably 50 to 90 weight percent, of the combined glycol-ammonia charge. The glycol and ammonia can be charged to the reaction zone as individual streams, or if desired, ammonia can be bubbled into the glycol and the glycol-ammonia solution charged to the reactor. The ammonia used can be charged in gaseous or liquid phase. The reaction is preferably carried out under anhydrous conditions, but small amounts of water, e.g., up to about 5 weight percent of the reaction mixture, can be tolerated. Generally, the mole ratio of ammonia to alkyl halide can be as low as 2/1, but is preferably in the range of 5/1 to 50/1.

The free alkylamine can be recovered from the reaction mixture by any suitable procedure, including distillation, solvent extraction, and the like. If a relatively low molecular weight alkyl halide is used in the reaction, the reaction mixture is present as a single phase from which the free alkylamine, glycol, and unconverted alkyl halide can be separately recovered, for example by distillation. However, if the alkyl radical of the alkyl halide has more than 8 to 10 carbon atoms, the reaction mixture will be present as two phases: a glycol-rich phase and an alkyl halide-rich phase. The free alkylamine will be found predominantly in the glycol-rich phase, as will minor amounts of unreacted alkyl halide. Solvent extraction of the glycol-rich phase can be employed for recovery of the alkylamine and alkyl halide from this phase, while distillation of the extract can be utilized for final recovery of alkylamine and recovery of alkyl halide for recycle. Ammonium halide by-product can be removed from the reaction mixture by crystallization, for example, and, if desired, can be allowed to pyramid somewhat through recycling before use of cooling means to effect this crystallization.

The alkyl halide-rich phase of the reaction mixture will contain primarily the unreacted or unconverted alkyl halide, and possibly some olefin which results from the dehydrohalogenation of the alkyl halide during ammonolysis. Such olefin can be separated from the alkyl halide, for example by distillation, if desired, and the olefin used in other processes. Alternatively, this phase can be treated with hydrogen halide to effect reconversion of the olefin to the alkyl halide compound, which can be recycled to the ammonolysis reaction.

The following examples further illustrate the aspects and advantages of this invention, but the various reactants, temperatures, and conditions, recited in these examples should not be construed so as to unduly limit this invention.

EXAMPLE I

A run was carried out in which ethylene glycol was employed as the solvent in the ammonolysis of 2-chlorododecane.

In this run, 125 ml. of ethylene glycol, 92 g. (0.449 mole) of 2-chlorododecane and 81 g. of gaseous ammonia were charged to a 1400 ml. stainless steel bomb. After sealing the bomb, the bomb was warmed under hot water and then placed on a rocker and gradually heated to 170° C. After reaching 170° C., the bomb was maintained at this temperature for 2 hrs. and 2 min., at which time the bomb was immersed in ice water. The ammonia was vented, the bomb was emptied and then washed with 100 ml. of ethylene glycol. The product was a dark brown liquid of two phases. The upper layer, comprising 2-chlorododecane, was separated, taken up in diethyl ether, washed with water, aqueous sodium hydroxide and again with water. The lower layer, comprising ethylene glycol, was extracted with n-pentane, and the pentane extract was combined with the washed 2-chlorododecane ether extract and evaporated on a rotary evaporator, which produced 80.3 g. of a yellow oil. Analysis of this oil by titration with perchloric acid in acetic acid indicated that 0.250 mole of 2-aminododecane was present in this oil. Furthermore, neutron activation analysis indicated that 8.8 g. of 2-chlorododecane was present in this oil.

The calculated yield of 2-aminododecane in this run was 55.7 mole percent based on the 2-chlorododecane charged while the conversion based on 2-chlorododecane was 90.5 mole percent. Thus, the calculated ultimate yield based on converted 2-chlorododecane was 61.5 mole percent.

In carrying out this run, the 2-aminododecane was produced directly and present in the reaction mixture as the free amine rather than the hydrochloride salt.

EXAMPLE II

A run was made in which 2-chlorododecane and a solution of ammonia in ethylene glycol were separately fed in a continuous manner to a reaction zone. In this run, the solution of ammonia in glycol was charged to a pump from a buret, while the 2-chlorododecane was charged to another pump from a buret. The discharge lines from the pumps passed to a common header which lead into a 1-liter stirred autoclave fitted with a condenser and a gas vent line fitted with a motor valve controlled by a pressure controller. The temperature on the autoclave was controlled by an electric heating jacket which was controlled by an automatic temperature controller. Over a 2-hr. period, 820 ml. of the solution of ammonia in ethylene glycol (density 1.17 g./ml.) was charged, while over the same period, 109 g. of 2-chlorododecane was charged. The solution of ammonia in glycol contained 15.5 wt. percent ammonia. The total charge of ammonia was 148.6 g. (8.74 moles) while the total charge of 2-chlorododecane was 109 g. (0.53 mole). The temperature in the reaction zone during the 2-hr. reaction time was 170° C., while the pressure in the reaction zone was maintained at 1000 p.s.i.g.

The reaction effluent was stripped on a rotary evaporator to remove ammonia, then extracted with five 200-ml. portions of n-pentane. The pentane extract was washed with two 250-ml. portions of water, then evaporated on a rotary evaporator to yield 90.1 g. of product layer. A total of 0.252 mole of 2-aminododecane was obtained from this layer. Thus, the per pass yield of 2-aminododecane is 47.6 mole percent based on the 2-chlorododecane charged, and the conversion based on converted dodecyl chloride was 48.6 mole percent.

EXAMPLE III

The run of Example II was repeated essentially, except that the reaction temperature was 190° C. and the reaction pressure was 1025 p.s.i.g. The solution of ammonia in ethylene glycol feed was 855 g., of which 131 g. (7.7 moles) was ammonia. The 2-chlorododecane feed was 116 g. (0.57 mole). The mole ratio of ammonia/2-chlorododecane was 13.5.

After working up the reaction effluent in the manner of Example II, 0.049 mole of unconverted 2-chlorododecane was recovered and 0.294 mole of 2-aminododecane was found in the glycol layer. The conversion based on 2-chlorododecane was 91.5 mole percent. The calculated per pass yield of 2-aminododecane was 51.7 mole percent based on the 2-chlorododecane charge, thus the calculated ultimate yield of converted 2-chlorododecane was 56.5 mole percent.

Various modifications and alterations of this invention will become apparent to those skilled in the art without departing from the scope and spirit of this invention, and it should be understood that this invention is not to be limited unduly to that set forth herein for illustrative purposes.

I claim:

1. In the method for the preparation of alkyl amines by the ammonolysis of alkyl halides having the general formula RX, where R is an alkyl radical with 1 to 20 carbon atoms and X is a halogen, selected from the group consisting of iodine, bromine, and chlorine, which is attached to a primary or secondary carbon atom of said alkyl radical, said method being carried out in the liquid phase, the improvement comprising carrying out said ammonolysis in the presence of a diluent selected from the group consisting of ethylene glycol, propylene glycol and glycerol in an amount sufficient to prevent salt formation.

2. The process according to claim 1, wherein the said halogen is iodine.

3. The process according to claim 1, wherein the said halogen is chlorine.

4. The process according to claim 1, wherein the said halogen is bromine.

5. A method which comprises reacting 2-chlorododecane with ammonia in ethylene glycol, said method being carried out in the liquid phase and in the presence of an amount of ethylene glycol sufficient to prevent salt formation, and separating the resulting 2-aminododecane as the product of reaction.

References Cited by the Examiner

Groggins, "Unit Processes in Organic Synthesis," McGraw-Hill, New York, third ed. (1947), page 351.

Taylor et al., "Sidgwick's Organic Chemistry of Nitrogen," Oxford Univ. Press, London (1945), page 13.

CHARLES B. PARKER, *Primary Examiner.*

A. H. SUTTO, R. L. RAYMOND, *Assistant Examiners,*